(12) United States Patent
Li et al.

(10) Patent No.: US 9,634,313 B2
(45) Date of Patent: Apr. 25, 2017

(54) ANTI-ROTATION MECHANISM FOR ELECTRODE TERMINAL POST OF LITHIUM-ION BATTERY

(71) Applicant: Ningde Amperex Technology Limited, Ningde (CN)

(72) Inventors: Quankun Li, Ningde (CN); Peng Wang, Ningde (CN); Pinghua Deng, Ningde (CN); Kai Wu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 546 days.

(21) Appl. No.: 14/195,782

(22) Filed: Mar. 3, 2014

(65) Prior Publication Data
US 2014/0255766 A1   Sep. 11, 2014

(30) Foreign Application Priority Data

Mar. 11, 2013   (CN) ..................... 2013 2 0110967 U

(51) Int. Cl.
*H01M 2/30*   (2006.01)
*H01M 2/06*   (2006.01)
*H01M 2/08*   (2006.01)

(52) U.S. Cl.
CPC .............. *H01M 2/307* (2013.01); *H01M 2/06* (2013.01); *H01M 2/08* (2013.01)

(58) Field of Classification Search
None
See application file for complete search history.

(56) References Cited

U.S. PATENT DOCUMENTS 5,747,195 A  *  5/1998  Alamgir ................ H01M 4/382
                                                    429/235

FOREIGN PATENT DOCUMENTS

CN           2452138 Y        10/2001

OTHER PUBLICATIONS

JP, 02249220 A (a raw machine translation) (Abstract) (1990).*
Shi et al. (CN 2452138) (a raw machine translation) (Abstract and Detailed Description) (Oct. 3, 2001).*
Encyclopaedia Britannica (Aug. 21, 2016).*
The Physics Factbook (2006).*

* cited by examiner

*Primary Examiner* — Patrick Ryan
*Assistant Examiner* — Carmen Lyles-Irving
(74) *Attorney, Agent, or Firm* — Morgan, Lewis & Bockius LLP

(57) ABSTRACT

The present disclosure provides an anti-rotation mechanism for an electrode terminal post of a lithium-ion battery, the anti-rotation mechanism for the electrode terminal post of the lithium-ion battery is an insulative piece, the insulative piece is provided on an electrode terminal post base which is fixedly connected to the electrode terminal post, and the insulative piece is also fixedly connected to an inner wall of a battery case of the lithium-ion battery. The rotation of the electrode terminal post of the lithium-ion battery can be effectively prevented through the insulative piece which is provided on the electrode terminal post base and is fixedly connected to the inner wall of the battery case of the lithium-ion battery.

6 Claims, 2 Drawing Sheets

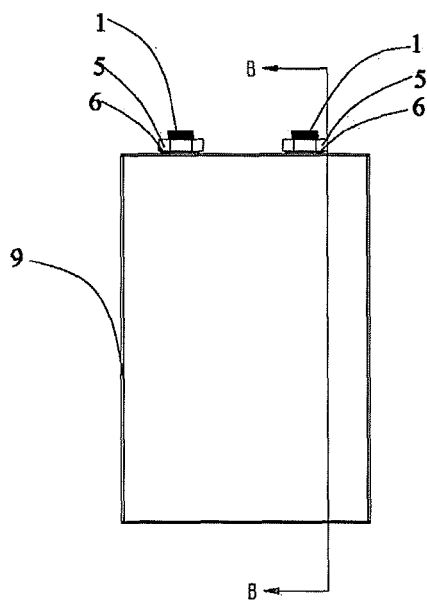
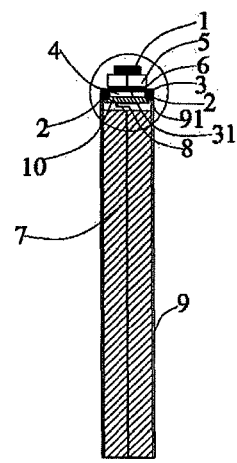
FIG.4  FIG.5
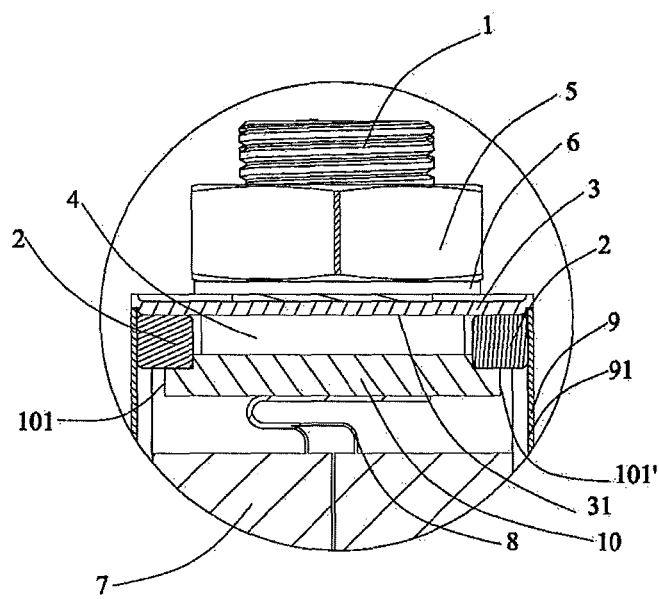
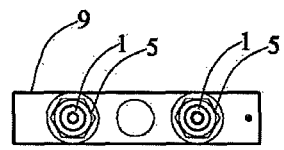
FIG.6  FIG.7

ANTI-ROTATION MECHANISM FOR ELECTRODE TERMINAL POST OF LITHIUM-ION BATTERY

REFERENCE TO RELATED APPLICATIONS

The Present Application claims priority to Chinese Patent Application No. CN 201320110967.6 filed on Mar. 11, 2013, the content of which is fully incorporated in its entirety herein.

FIELD OF THE PRESENT DISCLOSURE

The present disclosure relates to a secondary battery, and particularly to an anti-rotation mechanism for an electrode terminal post of a lithium-ion battery.

BACKGROUND OF THE PRESENT DISCLOSURE

At present, five components are used for a lithium-ion battery in the prior art, which comprises a battery cap plate, battery electrode terminal posts, insulating devices between the electrode terminal posts and the battery cap plate, sealing rings between the electrode terminal posts and the battery cap plate, and nuts. Connection mode of these components is as follows: the electrode terminal posts are provided through through holes of the battery cap plate, the sealing rings are provided for isolation sealing between the electrode terminal posts and the battery cap plate, the insulating devices are provided between the electrode terminal posts and the battery cap plate for insulation therebetween, the nuts are screwed on screw threads of the electrode terminal posts for fastening the sealing rings; as the screw threads are used for pre-fastening, the screw thread portions of the electrode terminal posts are cylindrical structure, such cylindrical structure will easily rotate when it is borne a torsion, thereby causing damage or fracture of tabs connected to the positive and negative electrode terminal posts, even causing short circuit due to contact with a metal battery case.

SUMMARY OF THE PRESENT DISCLOSURE

In view of the problem existing in the background of the present disclosure, an object of the present disclosure is to provide an anti-rotation mechanism for an electrode terminal post of a lithium-ion battery, which can effectively prevent rotation of the electrode terminal post of the lithium-ion battery.

In order to achieve the above object, the present disclosure provides an anti-rotation mechanism for an electrode terminal post of a lithium-ion battery, the anti-rotation mechanism for the electrode terminal post of the lithium-ion battery is an insulative piece, the insulative piece is provided on an electrode terminal post base which is fixedly connected to the electrode terminal post, and the insulative piece also is fixedly connected to an inner wall of a battery case of the lithium-ion battery.

The present disclosure has the following beneficial effects:

The rotation of the electrode terminal post of the lithium-ion battery can be effectively prevented by the insulative piece which is provided on the electrode terminal post base and is fixedly connected to the inner wall of the battery case of the lithium-ion battery.

BRIEF DESCRIPTION OF THE FIGURES

FIG. 4 is a front view of a lithium-ion battery provided with the anti-rotation mechanism for the electrode terminal post of the lithium-ion battery according to the present disclosure;

FIG. 5 is a cross-sectional view taken along a line B-B of FIG. 4;

FIG. 6 is an enlarged partial view indicated by a circle of FIG. 5;

FIG. 7 is a top view of FIG. 4.

Figure 1:
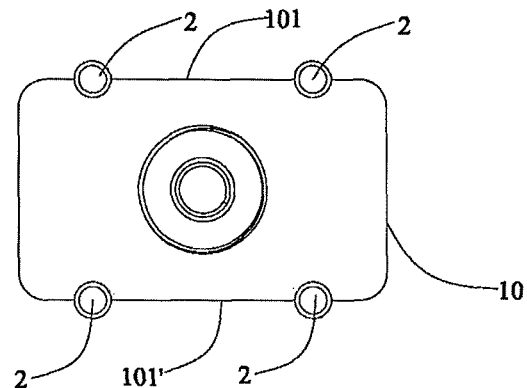
FIG. 1 is a top view of an anti-rotation mechanism for an electrode terminal post of a lithium-ion battery provided on an electrode terminal post base according to the present disclosure.

Reference numerals of the embodiments are represented as follows:

1 electrode terminal post
2 insulative piece
3 battery cap plate
   31 bottom surface
4 sealing ring
5 fastening nut
6 insulating device
7 cell
8 battery tab
9 battery case
   91 inner wall
10 electrode terminal post base
   101,101' side edge
   102 recessed groove

DETAILED DESCRIPTION

Hereinafter the anti-rotation mechanism for the electrode terminal post of the lithium-ion battery according to the present disclosure will be illustrated in combination with the drawings.

Figure 2:
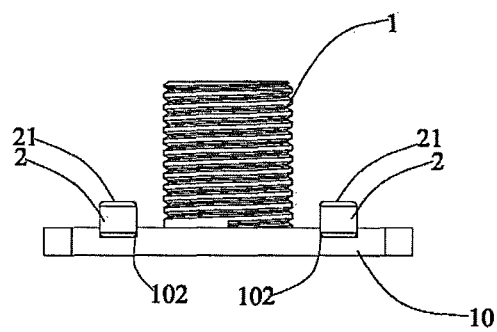
FIG. 2 is a front view of FIG. 1.
Figure 3:
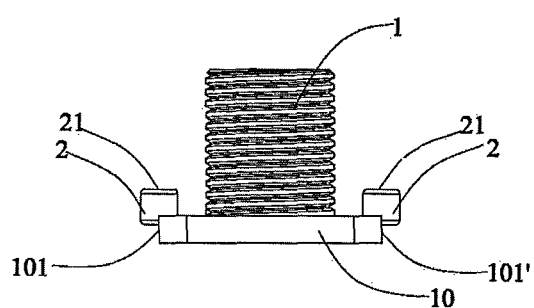
FIG. 3 is a side view of FIG. 1.

As shown in FIGS. 1-3 and FIGS. 5-6, an anti-rotation mechanism for an electrode terminal post of a lithium-ion battery according to the present disclosure is an insulative piece 2, the insulative piece 2 is provided on an electrode terminal post base 10 which is fixedly connected to an electrode terminal post 1, and the insulative piece 2 also is fixedly connected to an inner wall 91 of a battery case 9 of the lithium-ion battery. The provision of the insulative piece 2 not only can prevent rotation of the electrode terminal post 1 of the lithium-ion battery so as to improve safety performance of the lithium-ion battery, but also does not occupy additional space of the battery so as to facilitate to improve energy density of the battery. The fixed connection between the insulative piece 2 and the inner wall 91 of the battery case 9 of the lithium-ion battery can be achieved by direct abutting contact (as shown in FIGS. 5-6, also can be referred to as a direct fixed connection), furthermore, according to requirements for actual use, for example, an inner surface of the battery case 9 may be subjected to an insulating treatment (for example plating a layer of insulating ceramic film) or be installed with other element having similar insulating function, at this time, the fixed connection between the insulative piece 2 and the inner wall 91 of the battery case 9 of the lithium-ion battery is such a fixed connection that the insulative piece 2 is fixedly connected to the inner wall 91 of the battery case 9 of the lithium-ion battery such as the insulating ceramic film or other element having the insulating function (which can be referred to as an indirect fixed connection). In other words, either the direct fixed connection or the indirect fixed connection can be adopted, it is acceptable as long as the insulative piece 2 does not arbitrarily move relative to the inner wall 91 of the battery case 9 under a condition that a force is not beyond a predetermined force (i.e. a limit force causes the rotation of the electrode terminal post 1 of the lithium-ion battery).

In order to constrain the rotation of the electrode terminal post 1 of the lithium-ion battery more effectively, preferably, the insulative piece 2 also abuts against a bottom surface 31 of the battery cap plate 3 of the lithium-ion battery. In order to constrain the rotation of the electrode terminal post 1 of the lithium-ion battery more effectively, more preferably, the bottom surface 31 of the battery cap plate 3 of the lithium-ion battery may be further provided with a recess portion (not shown), and a top 21 of the insulative piece 2 is inserted into the recess portion.

In the anti-rotation mechanism for the electrode terminal post of the lithium-ion battery according to the present disclosure, preferably, the insulative piece 2 is a heat-resistant and electrolyte-resistant ceramic piece. The ceramic piece can effectively reduce a weight of the anti-rotation mechanism for the electrode terminal post of the lithium-ion battery. In order to allow the insulative piece 2 to prevent the rotation of the electrode terminal post 1 and have the insulating function even in case of accidental battery burning, preferably, the ceramic piece has a melt point not less than 500° C. and a volume resistivity higher than $10^{10}$ Ω·cm.

In order to constrain the rotation of the electrode terminal post 1 of the lithium-ion battery more effectively, preferably, the insulative piece 2 is provided on the electrode terminal post base 10 at each of two opposite side edges 101, 101' of the electrode terminal post base 10 relative to the electrode terminal post 1, so as to form a reverse torque relative to a torque formed by the rotation of the electrode terminal post 1. More preferably, the insulative pieces 2 provided at the two opposite side edges 101, 101' of the electrode terminal post base 10 are symmetrical relative to the electrode terminal post 1. Further preferably, the insulative pieces 2 are provided as four in number for one corresponding electrode terminal post 1.

In order to conveniently dispose the insulative piece 2, preferably, the electrode terminal post base 10 is provided with a recessed groove 102, the insulative piece 2 is inserted into the recessed groove 102 of the electrode terminal post base 10. In order to make full use of space, more preferably, the recessed groove 102 is provided at a corresponding side edge 101, 101' of the electrode terminal post base 10, and when the insulative piece 2 is inserted into the recessed groove 102, the insulative piece 2 is partially beyond the corresponding side edge 101, 101'.

In the anti-rotation mechanism for the electrode terminal post of the lithium-ion battery according to the present disclosure, the electrode terminal post base 10, battery cap plate 3, and battery case 9 are made from metal.

Hereinafter an installation process of the anti-rotation mechanism for the electrode terminal post of the lithium-ion battery and a manufacturing process of the lithium-ion battery according to the present disclosure will be briefly described.

The installation process includes steps as follows: firstly installing the insulative piece 2 of the anti-rotation mechanism for the electrode terminal post of the lithium-ion battery into the recessed groove 102 of the electrode terminal post base 10, sheathing a sealing ring 4 onto the electrode terminal post 1, installing the electrode terminal post 1 through a through hole of the battery cap plate 3 to make the sealing ring 4 positioned between the battery cap plate 3 and the electrode terminal post base 10, then sheathing the insulating device 6 onto the electrode terminal post 1 and positioned on the battery cap plate 3, and then fastening the nut 5 on a screw thread of the electrode terminal post 1, thereby finishing the assembly of the battery cap plate 3; welding the tab 8 of the cell 7 and the electrode terminal post base 10; then placing the cell 7 into the battery case 9, and welding the battery cap plate 3 and the battery case 9, thereby finishing manufacturing of the lithium-ion battery.

For the lithium-ion battery with a specification of a length of 220 mm, a width of 135 mm, and a thickness of 29 mm, a fastening type of the electrode terminal post 1 was M14 screw connection, the battery cap plates 3 respectively with and without the anti-rotation mechanism for the electrode terminal post of the lithium-ion battery were compared, the effect comparison was shown in table 1:

TABLE 1

Effect comparison in conditions of being with and without the anti-rotation mechanism for the electrode terminal post of the lithium-ion battery

| | Fastening types for the electrode terminal post | Anti-rotation torsion for the electrode terminal post | Safety performance |
|---|---|---|---|
| without the anti-rotation mechanism for the electrode terminal post of the lithium-ion battery | M14 screw fastening | 8N · M | General |
| with the anti-rotation mechanism for the electrode terminal post of the lithium-ion battery | M14 screw fastening | More than 15N · M | High |

It can be seen from the table 1, the anti-rotation torsion in the condition of being with the anti-rotation mechanism for the electrode terminal post of the lithium-ion battery is more than twice the anti-rotation torsion in the condition of being without the anti-rotation mechanism of the lithium-ion battery, so it is shown that the anti-rotation mechanism for the electrode terminal post of the lithium-ion battery according to present disclosure can significantly improve the anti-rotation performance of the electrode terminal post of the battery.

What is claimed is:

1. An anti-rotation mechanism for an electrode terminal post of a lithium-ion battery, the anti-rotation mechanism for the electrode terminal post of the lithium-ion battery being insulative pieces, each insulative piece being provided on an electrode terminal post base which is fixedly connected to the electrode terminal post, and each insulative piece also being fixedly connected to an inner wall of a battery case of the lithium-ion battery,
   wherein
      the insulative pieces are provided on the electrode terminal post base at two opposite side edges of the electrode terminal post base relative to the electrode terminal post, the insulative pieces being spaced apart from each other;
      a bottom surface of a battery cap plate is provided with recess portions, a top of each insulative piece is inserted into one recess portion; and a top surface of the electrode terminal post base is provided with recessed grooves, wherein each recessed groove is recessed downwards from the top surface of the electrode terminal post base, and wherein a bottom of each insulative piece is inserted into one recessed groove of the electrode terminal post base.

2. The anti-rotation mechanism for the electrode terminal post of the lithium-ion battery according to claim 1, wherein the insulative piece is a heat-resistant and electrolyte-resistant ceramic piece.

3. The anti-rotation mechanism for the electrode terminal post of the lithium-ion battery according to claim 2, wherein the ceramic piece has a melt point not less than 500° C. and a volume resistivity higher than $10^{10}$ Ω·cm.

4. The anti-rotation mechanism for the electrode terminal post of the lithium-ion battery according to claim 1, wherein the insulative pieces provided at the two opposite side edges of the electrode terminal post base are symmetrical relative to the electrode terminal post.

5. The anti-rotation mechanism for the electrode terminal post of the lithium-ion battery according to claim 1, wherein the insulative pieces are provided as four in number for one corresponding electrode terminal post.

6. The anti-rotation mechanism for the electrode terminal post of the lithium-ion battery according to claim 1, wherein each recessed groove is provided at the corresponding side edge of the electrode terminal post base, and wherein when the bottom of each insulative piece is inserted into the recessed groove, each insulative piece is partially beyond the corresponding side edge.

* * * * *